United States Patent [19]

Best

[11] Patent Number: 5,448,423
[45] Date of Patent: Sep. 5, 1995

[54] MAGNETIC HEAD COMPENSATOR

[75] Inventor: Donald T. Best, Lafayette Hill, Pa.

[73] Assignee: North American Philips Corporation, New York, N.Y.

[21] Appl. No.: 845,872

[22] Filed: Mar. 3, 1992

Related U.S. Application Data

[63] Continuation of Ser. No. 480,268, Feb. 15, 1990, abandoned.

[51] Int. Cl.⁶ .................. G11B 5/035; G11B 5/09; G11B 15/12
[52] U.S. Cl. .......................... 360/65; 360/46; 360/61
[58] Field of Search ................ 360/46, 65, 67

[56] References Cited

U.S. PATENT DOCUMENTS

| | | |
|---|---|---|
| 4,479,152 | 10/1984 | Chi ........................... 360/46 |
| 4,564,869 | 1/1986 | Baumeister ............... 360/65 |
| 4,656,533 | 4/1987 | Sakai et al. ............... 360/65 |

OTHER PUBLICATIONS

Philips Res. Rep. 8, 148–157, Studies on Magnetic Recording, by W. K. Westmijze Mar., 1953.

*Primary Examiner*—Aristotelis Psitos
*Assistant Examiner*—W. Chris Kim
*Attorney, Agent, or Firm*—David R. Treacy

[57] ABSTRACT

A magnetic head having a fixed gap length ($g_n$) can be compensated to simulate a head with a larger gap length. This magnetic head is adapted to read alternate magnetic media recorded with at least a selected one (x) of a plurality of wavelengths, to produce a head signal. A compensator has a transfer circuit and a disabling device. The transfer circuit is coupled to and driven by the magnetic head to produce a compensated signal that is a function of x, for simulating another gap length ($g_1$) different from the fixed gap length. The disabling device is coupled to the transfer circuit for selectively preventing simulation of a different gap length.

20 Claims, 1 Drawing Sheet

MAGNETIC HEAD COMPENSATOR

This is a continuation of application Ser. No. 07/480,268, filed Feb. 15, 1990 abandoned.

BACKGROUND OF THE INVENTION

The present invention relates to magnetic head compensators and, in particular, to equipment capable of handling media containing information stored magnetically at various wavelengths.

Known mass storage media store digital data on a magnetic tape or disk in a high density bit pattern. As this technology advances, improved heads and recording techniques allow higher density recording of the bit patterns, at times increasing the density by a factor of two or more. With certain recording channel codes such as that used in the tape drive industry, standard HI/TC products (and incidentally, in the IBM 3480 tape drive), the all-zeroes pattern, recorded at double the frequency of the all-ones pattern, is deliberately suppressed in the readback process. However, if a new read head is designed for a tape drive which is to operate, for example, at double the bit density (hence frequency) of the original, but still must also be capable of reading tapes previously recorded on the original lower density equipment, a serious problem arises. The same frequency (all-zeroes) that was suppressed in the original readback process now represents the all-ones pattern, which must not be suppressed when the head is reading the double-density tape. Yet that frequency must be suppressed when the head is reading the original lower density tapes. Similar statements could be made if instead the density were to be tripled, quadrupled, etc.

A higher density normally requires a smaller gap length on the magnetic heads that read from and write to the tape or disk. It is well known that the output from a magnetic head reading the recorded information varies as function of $\sin(z)/z$, where $z$ is inversely proportional to wavelength and directly proportional to the gap length times $1.12\,\pi$.

The foregoing includes a factor to correct the physical gap to the functional gap, according to the well-known Westmijze paper.

In principle, a filter can be switched into the readback path of the tape drive, which would alter the overall transfer function of the new head design and read channel to behave as the original head and readback path when it is desired to read tapes written at the original density. This filter in tandem with the new read head reproduce the transfer function of the original head. However, in general, filters having the desired amplitude response have an improper phase response and vice versa.

Transversal filters, a form of "universal" filter, are often represented and implemented by a delay line of length $2NT$ with $(2N+1)$ equally spaced taps. The outputs of the taps are scaled to $A_n$ and $A_{-n}$ and are summed in an output summer. The output of the filter is delayed by $NT$, half the delay line length. If each $A_n$ is set equal to $A_{-n}$, one gets zero phase shift.

Accordingly, there is a need for a technique for enabling a drive to read various media recorded at various wavelengths in a simple way without introducing phase distortions that can adversely affect performance.

SUMMARY OF THE INVENTION

In accordance with the illustrative embodiments demonstrating features and advantages of the present invention, there is provided a compensator for a magnetic head having a fixed gap length ($g_n$). This magnetic head is adapted to read alternate magnetic media recorded with at least a selected one (x) of a plurality of wavelengths to produce a head signal. The compensator has a transfer means and a disabling means. The transfer means is coupled to and driven by the magnetic head to produce a compensated signal that is a function of x, for simulating another gap length ($g_1$) different from the fixed gap length. The disabling means is coupled to the transfer means for selectively preventing simulation of that other gap length.

A related method of the same invention can compensate a magnetic head having a fixed gap length ($g_n$). This magnetic head is adapted to read alternate magnetic media recorded with at least a selected one (x) of a plurality of wavelengths to produce a head signal. The method includes the step of electrically converting the head signal to produce a compensated signal that is a function of x, for simulating another gap length ($g_1$) different from the fixed gap length. The method also includes the step of selectively disabling the electrical conversion of said head signal to prevent simulation of that other gap length.

By providing apparatus and methods of the foregoing type, an improved technique for reading a magnetic medium is achieved. Specifically, an improved drive designed to work at a greater bit density than before, can be configured to read magnetic media recorded at the previous lower bit density. In a preferred embodiment, the compensator is a transversal filter that can be switched in series with the output of a magnetic read head having a relatively small gap length.

In this preferred embodiment, the transversal filter includes a delay line that may have intermediate taps. The input and output to the delay line as well as the outputs of the optional taps can be linearly combined to produce a compensated output. This compensated output will be relatively free from phase distortions, so that drive performance will be satisfactory.

By chosing the delays and the summing mixture, the filter can simulate the output of a magnetic read head having a larger gap length. Thus when an older magnetic medium having relatively long wavelengths is read, the transversal filter will compensate the data produced with the relatively small gap length so the result appears as if it were read by a head having a relatively large gap length.

BRIEF DESCRIPTION OF THE DRAWINGS

The above brief description as well as other features and advantages of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
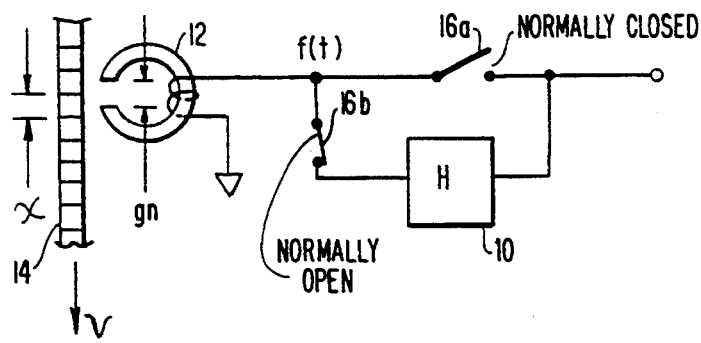
FIG. 1 is a block schematic diagram showing a compensator connected to a magnetic read head in accordance with the principles of the present invention.

In designing a drive for a high density storage device such as a tape or disk drive, a designer must take into account the gap loss function associated with the magnetic read head. The output of a magnetic read head may be considered a function of $S(g/x)F(jw)$, where $F$ is a driving function and $S$ is the gap loss function. The gap loss function $S$ can be represented as follows:

$$S(g/x) = [\sin(\pi g/x)]/[\pi g/x] \qquad (1)$$

where $g$ is the gap length and $x$ is the wavelength of the recording. The foregoing gap loss function is only approximate but can be made very close to the actual function by adding about 12% to the physical gap length. Such a correction was suggested by W. K. Westmijze of N. V. Philips.

When redesigning a magnetic head to read higher density recordings, the gap length may be reduced so that the function $S$ is altered. Accordingly, if a magnetic medium containing a relatively long wavelength is read by that new magnetic head, the gap loss function of the new head design may not be suitable for earlier lower density recordings. This is particularly true for the channel code used in HI/TC and IBM 3480 tape drives.

Accordingly, it would be advantageous to change the gap length so that it is optimally suited to the wavelength on the medium being read. Since physically changing magnetic heads or providing multiple heads is an unsatisfactory solution, it is desirable to alter the gap loss function electrically. If the gap loss function of a drive having a relatively small gap length is defined as $S_n$ and the gap length appropriate for a longer wavelength media is defined as $S_1$ then the ideal compensation for the magnetic head would be a transfer function of the form $S_1/S_n$. This transfer function, referred to herein as $H_n$, would be of the following form:

$$H_n = [g_n \sin(\pi g_1/x)]/[g_1 \sin(\pi g_n/x)] \qquad (2)$$

Where $x$ is the relatively long wavelength, $g_n$ is the actual gap length corrected by 12% and $g_1$ is the simulated gap length corrected by 12%. This function uses the well known gap loss function of equation 1. If the simulated gap length $g_1$ is twice the actual gap length, trigonometric identities can be used to simplify equation 2 as follows:

$$H_2 = \cos(\pi g_2/x) \qquad (3a)$$

This can be expressed in the frequency domain by recognizing that if the tape is moving at a speed $v$, wavelength $x$ would produce a frequency $v/x = f$. Also, expressing this in the angular frequency domain $w$, where $w = 2\pi f$, this becomes:

$$H_2 = \cos(wg_2/2v) \qquad (3b)$$

Now $g_2/2v$ has the dimension of time, so we set it equal to $D_2$. Finally:

$$H_2(jw) = \cos(wD_2) = \tfrac{1}{2}e^{-jwD_2} \qquad (4a)$$

If the input driving function to this filter is expressed as $F_i(jw)$ in the frequency domain, then the output of the filter will be:

$$F_0(jw) = F_i(jw)[\tfrac{1}{2}e^{jwD_2} + \tfrac{1}{2}e^{-jwD_2}] \qquad (4b)$$

Writing this as a Fourier transform:

$$F_0(s) = F_i(s)[\tfrac{1}{2}e^{sD_2} + \tfrac{1}{2}e^{-sD_2}] \qquad (4c)$$

Transforming to the time domain:

$$f_0(t) = \tfrac{1}{2}f_i(t+D_2) + \tfrac{1}{2}f_i(t-D_2) \qquad (4d)$$

Figure 2:
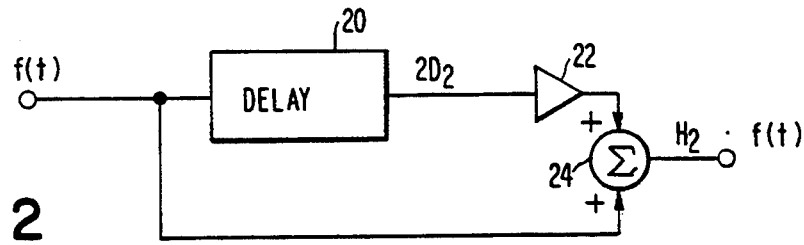
FIG. 2 is a more detailed schematic diagram of the transfer means of FIG. 1.

The circuit of FIG. 2 for an input of $f_i(t)$ will produce an output of:

$$f_0(t) = f_i(t) + f_i(t-2D_2) \qquad (5)$$

but this is an implementation of (4d) with an acceptable pure time delay of $D_2$ and a welcome factor of 2 amplitude increase. Thus, this transversal filter when switched into the readback data path makes the short gap length read head behave as the earlier longer gapped head. The overall response for lower density tapes will be as the response in earlier tape drives. The data can then be recovered from the waveform as done in those earlier tape drives.

The transformation from analysis using recorded wavelengths to frequency analysis is rigorously true only when speed is absolutely constant, never strictly so in tape or disk drives. However, because the filters amplitude rolloff at the important all-ones frequency is slow and because the filter has zero-phase response, in practical terms, the speed may vary more than is commonly experienced without causing problems.

In a particular case, the gap length $g_1$, after correction according to Westmijze, is about 1 micron, so for a double bit density, the corrected gap length $g_2$ would be 0.5 micron. As above, delay $D_2$ equals $g_2/2v$. Again in this particular case, the tape is moved at 2 meters/second so the preferred delay, $2D_2$, will be a time duration of 250 ns, a very practical value for a high bandpass delay line.

Referring to FIG. 1 such a circuit is symbolized by transfer function H of block 10. Block 10 is connected to the output of a magnetic read head 12 having gap length $g_n$. The read head is shown adjacent to a magnetic medium 14 recorded with digital bits at a wavelength $x$. The output of magnetic head 12, function $f(t)$, is connected to the output through the parallel combination of block 10 and disabling means 16. Means 16 is shown as a shorting switch contact in one path and an opening contact in another, although in other embodiments, transfer block 10 can be disconnected or its delays eliminated so that it provides a unity transfer function.

Referring to FIG. 2, transfer function H is shown to include a delay circuit 20. Delay circuit 20 may be a delay line in a 14 pin DIP package. An appropriate bandwidth may be about 3.4 MHz which is quite distant from the all-ones frequency that can be expected. A typical all-ones frequency can be 709 kHz. Delay line 20 can have an internal terminating resistor to save space. It will appreciated that other types of delay lines can be used involving electrically long conductors, charge coupled devices etc.

The output terminal, f(t), connects to the input of delay line 20 whose output connects to buffer amplifier 22, which can have unity or some other gain. In the present embodiment, buffer 22 is a unity gain amplifier, although in some embodiments the gain can be adjusted to tailor the characteristics of the response as desired. Also the gain of buffer 22 can be made somewhat greater than unity to account for losses in delay line 20.

Signal f(t) is connected to one input of summer 24, whose other input is connected to the output of buffer 22. The output of summer 24 is identified as $H_2 \cdot f(t)$. Summer 24 can be an operational amplifier, although a simple resistive summing network can be used if advantage is taken of the gain in buffer 22.

There may be improved drives that have triple the bit density of earlier drives. In this case, the transversal filter must be designed to accommodate this higher density. By again using trigonometric identities, the analysis performed in equations 2–4 can be applied to the triple density situation. Additional terms will occur because of the tripling of the argument in the trigonometric function. The analysis is simplified to the two equations indicated below:

$$H_3 = \tfrac{1}{3}[2\cos(2\pi f g_3/v) + 1] \tag{6}$$

$$H_3 \cdot f(t) = [f(t - 4D_3) + f(t - 2D_3) + f(t)] \tag{7}$$

Equation 6 shows the transfer function $H_3$ for the $\tfrac{1}{3}$ as narrow gap length $g_3$. Equation 7 shows that the transfer function of the circuit of FIG. 3 is equivalent to the summation of the original signal and two delayed signals.

Figure 3:
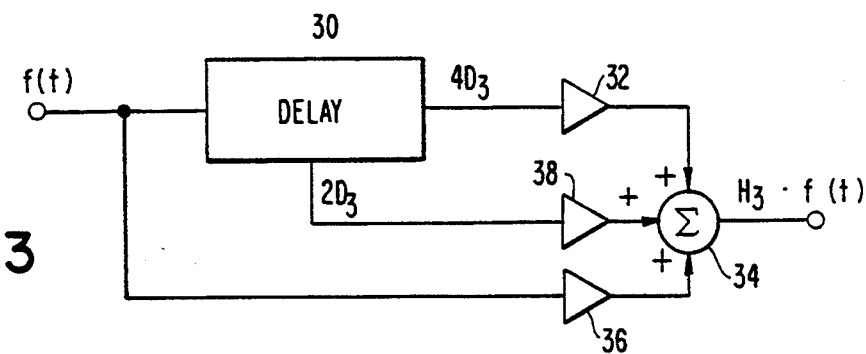
FIG. 3 is a schematic diagram of a transfer means that is an alternate to that of FIG. 2.

Referring to FIG. 3, equation 7 is implemented with a delay line 30 similar to the previously illustrated delay, but with a tap $2D_3$. From equation 6 and 7 delay $D_3$ is equal to $g_3/v$. Accordingly, the total delay $4D_3$ will be 333.33 ns, with a tap delay of half that amount. The signal, f(t), is connected to the input of delay 30 whose output $4D_3$ connects to the input of buffer 32 whose output connects to one summing input of summer 34. The input f(t) also connects to the input of buffer 36 whose output connects to another input of summer 34. The tap delay $2D_3$ connects to the input of buffer 38 whose output connects to another input of summer 34. As before, buffers 32, 36 and 38 can be set to account for losses in delay 30. Alternatively, the gains of these buffers can be adjusted to tailor the compensation, as desired. The output of summer 34 is designated $H_3 \cdot f(t)$.

The analysis can be carried forward to quadruple density. In this case, the quadrupled arguments of the trigonometric functions require different trigonometric identities. The foregoing analysis illustrated in equations 2–4 can be once again repeated and can be summarized below as follows:

$$H_4 = \tfrac{1}{4}[\cos(6\pi f g_4/2v) + \cos 2(2\pi f g_4/2v)] \tag{8}$$

$$H_4 \cdot f(t) = ]f(t - 6D_4) + f(t - 4D_4) + f(t - 2D_4) + f(t)] \tag{9}$$

The overall delay $6D_4$ is equal to $6g_4/2v$. Accordingly, the overall delay is 375 ns.

Figure 4:
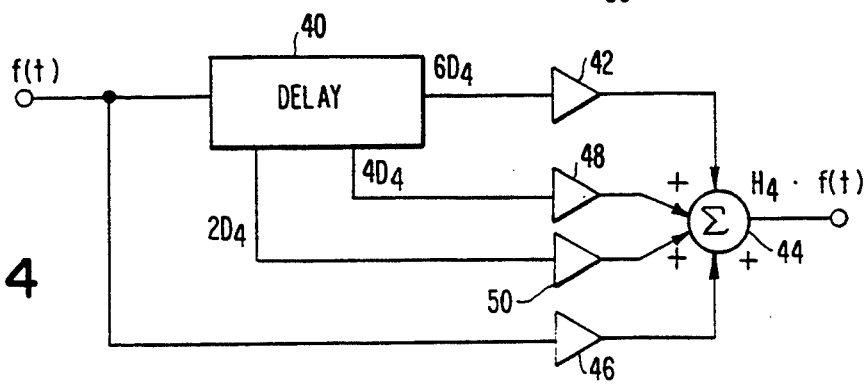
FIG. 4 is a schematic diagram of a transfer means that is an alternate to that of FIG. 2.

Referring to FIG. 4 the circuit corresponding to equation 9 is illustrated. Delay line 40 has an overall delay of 375 ns with taps $2D_4$ and $4D_4$ providing delays of $\tfrac{1}{3}$ and $\tfrac{2}{3}$, respectively, of the overall delay. The output of delay circuit 40 is coupled through buffer 42 to one summing input of summer 44. The input f(t) is connected to both the input of delay 40 and to the input of buffer 46, whose output connects to another summing input of summer 44. The taps $2D_4$ and $4D_4$ separately connect to the inputs of buffers 48 and 50, respectively, whose outputs connect to separate summing inputs of summer 44. The output of summer 44 is identified as $H_4 \cdot f(t)$.

In operation, any of the circuits of FIGS. 2–FIG. 4 can be used in block 10 of FIG. 1, depending upon whether the simulated gap lengths should be two, three or four times the actual gap length. When the simulated longer gap length is needed, switch 16 is operated so that transversal filter 10 changes the characteristic of the output of head 12. Accordingly, the output of transversal filter 10 simulates a head having a larger gap length. Thus a medium 14 with a relatively long wavelength x can be read without distortion.

The foregoing transversal filters will produce a null at 2 MHz but are not truly low pass filters since their response starts to increase again after the null, theoretically as fast as it fell. Thus these filters can be regarded as form of notch filter with 180° phase reversal after the notch. But these filters produce a gap loss function simulating a head with a larger gap and will create no signal to noise disruption or aliasing.

Up to this point, the discussion has related primarily to conventional "inductive" read heads which contain one gap. However, shielded magnetoresistive (MR) read heads, a now-common form of "thin-film" read heads, have two gaps, one between the MR element and a left-hand shield and the other between the MR element and the right-hand shield.

The ideal thin film magnetic read head has its reading element exactly half way between the two shields and is extremely thin relative to all other dimensions. This ideal head has a different gap loss function than a conventional inductive head. For a double density case, the filter needed is similar to the triple density case for a conventional head.

Most practical shielded MR heads have the MR element asymmetrically disposed between the two shields. These have a very complex gap loss function, different from both the inductive head and the ideal thin film head.

Essentially a designer will take measurements or make some involved calculations to characterize the actual head. It will have both a very complicated amplitude function and a non-zero phase response. However, because of the foregoing and the versatility of transversal filters and the ability to tailor its characteristic by adjusting the associated buffers, this non-ideal complexity can be accounted for by tailoring the gain of the various buffers.

In addition, further filtering may be required for other purposes in which case then, the transversal filter can be tailored further to accomplish that requirement. Accordingly, other filters normally included in a drive can be incorporated into the transversal filters. The above transversal filters all produce linear functions so other taps and paths attached to and attenuated from the presently used taps, could all feed into the summing point to superimpose other needed functions. Thus, although these filters represent additional hardware, there is an opportunity for eliminating other hardware.

Obviously, many modifications and variations of the present invention are possible in light of the above teachings. It is therefore to be understood that within the scope of the appended claims, the invention may be practiced otherwise than as specifically described.

What is claimed is:

1. A compensator for a magnetic head arranged such that, responsive to reading a recorded signal on a magnetic medium, said magnetic head produces a head signal, said magnetic head having a first fixed gap length ($g_n$) selected for reading said recorded signal when recorded at a given wavelength; said compensator comprising:

transfer means receiving said head signal, for producing a compensated signal that simulates a longer-gap head signal that would be produced by a magnetic head having a second fixed gap length ($g_1$) greater than $g_n$, and disabling means coupled to said transfer means for selectively preventing said transfer means from simulating said longer-gap head signal, whereby said compensator is operable selectively for providing from one magnetic head having said first fixed gap length, when reading signals recorded at a wavelength X greater than said given wavelengths, signals simulating the head signals that would be provided by heads having gap lengths longer than said first fixed gap length.

2. A compensator according to claim 1 wherein said transfer means produces a compensated signal approximately a function of $[g_n \sin(1.12\pi g_1/x)]/[g_1 \sin(1.12\pi g_n/x)]$ over a limited bandwidth.

3. A compensator according to claim 2 wherein said transfer means comprises:

a delay means coupled to said magnetic head for delaying said head signal by a given time duration to produce a delayed signal, and a combining means coupled to said magnetic head and said delay means for adding signals proportional to said head signal and said delayed signal to provide said compensated signal.

4. A compensator for a magnetic head arranged such that, responsive to reading a recorded signal on a magnetic medium, said magnetic head produces a head signal, said magnetic head having a first fixed gap length ($g_n$) selected for reading said recorded signal when recorded at a given wavelength; said compensator comprising:

transfer means including a delay means and a combining means, said delay means and combining means each receiving said head signal, for producing a compensated signal that simulates a longer-gap head signal that would be produced by a magnetic head having a second fixed gap length ($g_1$) greater than $g_n$, and disabling means coupled to said transfer means for selectively preventing said transfer means from simulating said longer-gap head signal, said delay means being coupled to said magnetic head for delaying said head signal by a given time duration to produce a delayed signal, and said combining means being coupled to said magnetic head and said delay means for adding signals proportional to said head signal and said delayed signal to provide said compensated signal, whereby said compensator is operable selectively for providing from one magnetic head having said first fixed gap length, when reading signals recorded at a wavelength x greater than said given wavelength, signals simulating the head signals that would be provided by heads having gap lengths longer than said first fixed gap length.

5. A compensator according to claim 4 wherein said combining means provides said compensated signal as a linear combination of said delay signal and the head signal.

6. A compensator according to claim 4 wherein said delay means is operable to provide a secondary signal delayed with respect to said head signal by a secondary interval that is smaller in magnitude than said given time duration, said combining means being further responsive to said secondary signal.

7. A compensator according to claim 6 wherein said delay means is operable to provide a tertiary signal delayed with respect to said head signal by a tertiary interval that is smaller in magnitude than said secondary interval, said combining means being further responsive to said tertiary signal.

8. A compensator according to claim 7 wherein said secondary interval is two-thirds of said given time duration and wherein said tertiary interval is one-third of said given time duration.

9. A compensator according to claim 6 wherein said secondary interval is half of said given time duration.

10. A compensator according to claim 6 wherein said combining means provides said compensated signal as a linear combination of said delayed signal and the head signal.

11. A compensator according to claim 4 wherein said delay means produces a plurality of delayed signals, each delayed by a respective multiple of said given time duration, and said combining means adds signals proportional to said head signal and said delayed signals.

12. A method of reading a recorded signal having a selected one of a plurality of wavelengths x on a magnetic medium, using a magnetic head producing a head signal and having a fixed gap length ($g_n$) selected for reading said recorded signal when the selected one wavelength is a given wavelength, wherein at least one of the wavelengths x has a value greater than said given wavelength, comprising:

electrically converting said head signal in a transfer means to produce a compensated signal that is a function of x, for simulating a longer-gap head signal that would be produced by a magnetic head having a fixed gap length ($g_1$) greater than $g_n$, and selectively disabling said transfer means for selectively preventing said transfer means from simulating said longer-gap head signal, whereby upon reading a recorded signal having a wavelength x greater than said given wavelength, said compensated signal simulates said longer-gap head signal; and upon said selectively disabling and then reading a recorded signal having a wavelength equal to said given wavelength, an uncompensated signal is produced.

13. A method according to claim 12 wherein said electrical conversion of said head signal produces a compensated signal approximately a function of $[g_n \sin(1.12\pi g_1/x)]/g_1 \sin(1.12\pi g_n/x)]$ over a limited bandwidth.

14. A method according to claim 13 wherein said electrical conversion of said head signal comprises the steps of:

delaying said head signal by a given time duration to produce a final signal; and providing a compensated signal responsive to the final signal and the head signal.

15. A method according to claim 14 wherein said compensated signal is provided as a linear combination of said final signal and the head signal.

16. A method according to claim 14 further comprising the step of:

secondarily delaying said head signal by a secondary interval that is smaller in magnitude than said given time duration to produce a secondary signal, said compensated signal being further responsive to said secondary signal.

17. A method according to claim 16 further comprising the step of:

tertiarily delaying said head signal by a tertiary interval that is smaller in magnitude than said secondary interval to produce a tertiary signal, said compensated signal being further responsive to said tertiary signal.

18. A method according to claim 17 wherein said secondary interval is two-thirds of said given time duration and wherein said tertiary interval is one-third of said given time duration.

19. A method according to claim 16 wherein said secondary interval is half of said given time duration.

20. A method according to claim 12 wherein said electrical conversion of said head signal comprises the steps of:

delaying said head signal by a given time duration to produce a final signal; and providing a compensated signal responsive to the final signal and the head signal.

* * * * *